United States Patent
Hogan et al.

(10) Patent No.: US 6,443,531 B1
(45) Date of Patent: Sep. 3, 2002

(54) METHOD FOR MANUFACTURING A WHEEL COVER

(75) Inventors: Scott A. Hogan, Sylvan Lake; Robert J. DiMarco, Rochester Hills, both of MI (US); Patrick Griffin; Steve G. Smith, both of Pittsburgh, PA (US); Gregory C. Stawara, Auburn Hills, MI (US); Tim E. Garwood, Dayton, OH (US); Edward J. Belanger, Rochester Hills, MI (US); Bridget Wise, Dayton, OH (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 09/667,205

(22) Filed: Sep. 21, 2000

(51) Int. Cl.[7] .................................................. B60B 7/00
(52) U.S. Cl. .................................. 301/37.42; 301/37.34
(58) Field of Search ...................... 301/37.101, 37.26, 301/37.102, 37.31, 37.34, 37.42

(56) References Cited

U.S. PATENT DOCUMENTS

| | | | | |
|---|---|---|---|---|
| 3,883,181 A | * | 5/1975 | Dissinger | 301/37.34 |
| 4,219,241 A | * | 8/1980 | Muller et al. | 301/37.34 |
| 4,682,820 A | * | 7/1987 | Stalter | 301/37.34 |
| 4,707,035 A | * | 11/1987 | Kondo et al. | 301/37.34 |
| 4,790,605 A | * | 12/1988 | Stalter, Sr. | 301/37.34 |
| 4,991,909 A | * | 2/1991 | Hamada | 301/37.34 |
| 5,368,370 A | | 11/1994 | Beam | 301/37.36 |
| 5,457,886 A | * | 10/1995 | Fuller | 301/37.1 |
| 5,464,276 A | * | 11/1995 | Ott | 301/37.34 |
| 5,820,225 A | | 10/1998 | Ferriss et al. | 301/37.1 |
| 5,931,543 A | * | 8/1999 | Smith | 301/37.42 |
| 5,988,762 A | | 11/1999 | Asada et al. | 301/37.1 |
| 6,030,050 A | * | 2/2000 | Ichikawa et al. | 301/37.42 |
| 6,045,195 A | * | 4/2000 | Okamoto | 301/37.34 |
| 6,168,242 B1 | * | 1/2001 | Mokerji | 301/37.42 |
| 6,247,760 B1 | * | 6/2001 | Kinoshita | 301/37.34 |

OTHER PUBLICATIONS

In–Molded Part Decoration, Bayer Corporation, Plastics Division, Patrick J. Griffin, Bayer Corporation, Polymers Division, Dec. 1998.

* cited by examiner

Primary Examiner—S. Joseph Morano
Assistant Examiner—Long Bao Nguyen
(74) Attorney, Agent, or Firm—Bliss McGlynn & Nolan, P.C.

(57) ABSTRACT

A method of making a wheel cover having a decorative outboard surface and an inboard surface for placement on a vehicle wheel includes the steps of forming a wheel cover substrate having a substrate contour providing the inboard substrate surface and with an outer substrate surface for bonding a skin thereto. The skin has a decoration applied to an inner skin surface for placement between the skin and the substrate. The skin has a decoration applied thereto. It is then cut to a desired shape complementing the substrate. It may, at that point, be deformed to also complement to contour of the substrate. The skin is bonded to the substrate by welding the materials to one another or by an adhesive. The method is particularly suitable for use with a center cap having protrusions extending from the inboard surface and having a protrusion thickness wherein the substrate is formed with a decreased substrate thickness less than two times the protrusion thickness so that any depressions which may occur in the outer substrate surface opposing the protrusions due to the decreased thickness are hidden or smoothed over by the skin applied thereto.

8 Claims, 3 Drawing Sheets

METHOD FOR MANUFACTURING A WHEEL COVER

BACKGROUND OF THE INVENTION

1. Field of the Invention

The invention relates to wheel covers for vehicular wheels. More specifically, the invention relates to a method of manufacturing and making a decorative wheel cover of multi-layer design.

2. Description of the Related Art

Wheel ornamentation, such as wheel covers, are aesthetic devices used to enhance the look of the wheels to which they are attached. Wheel covers in the form of center caps are used to cover the lug nuts and any of the wheel hub which may be viewable through the center of the wheel. Wheel covers are used because the manufacture, finish and mounting of a wheel cover to a wheel is less expensive than manufacturing a wheel having the same quality finish of a wheel cover. A chrome surface on a wheel cover is an inexpensive alternative to a chrome plated or polished wheel. In addition, wheel covers provide various types of appearances and styling variations, all of which may be combined with a single wheel design. The desirability of wheel covers is, however, directly proportional to the ability to inexpensively manufacture and attach them to the wheel while adding little weight to the overall composite wheel.

An example of a wheel cover and center cap system is set forth in U.S. Pat. No. 5,820,225 issued Oct. 13, 1998 and assigned to the assignee of the invention. The wheel includes a center cap which substantially covers and trims the center hole of the spider of the wheel. The cap may be snap fit or fastened to the spider or wheel to cover the lug stud area and hub.

FIGS. 2 and 3 of the above-identified patent application illustrate a typical wheel cover or center cap known in the prior art. The center cap 100 includes a shaped or contoured body 102 having guide protrusions 104 and locking protrusions 106 extending therefrom. In order to form a smooth contoured upper surface of the body, the body 102 must be two times as thick as the protrusions 104, 106. Otherwise, depressions may occur in the upper surface of the center cap opposing the protrusions 104, 106 creating an aesthetically displeasing appearance.

SUMMARY OF THE INVENTION

The invention includes a method of making a decorative wheel cover having an inboard surface and an outboard surface for placement on a vehicle wheel. The method includes the steps of forming a wheel cover substrate having a substrate contour with an outer substrate surface and providing the inboard surface to be placed adjacent the vehicle wheel, forming a thin skin having an inner skin surface and providing the outboard surface, and cutting the skin to a predetermined shape. The method also includes the steps of applying a decoration to the skin, deforming and shaping the skin to complement the substrate contour, and securing the skin to the substrate with the inner skin surface adjacent the outer substrate surface forming the wheel cover.

The invention also includes a multi-layer wheel cover for a vehicle wheel including a wheel cover substrate having a substrate contour and of a substrate thickness with an outer substrate surface and an inboard surface to be placed adjacent a vehicle wheel, and a skin formed of complementing contour and secured to the outer substrate surface. A decoration is applied between the substrate and skin. The wheel cover also includes a center cap with protrusions extending therefrom to be received by the vehicle wheel and having a protrusion thickness at least two times the substrate thickness causing depressions to occur wherein the skin smooths over the depressions to prevent contour changes on the outer skin surface.

The advantages of the subject invention over the prior art include the reduction in material costs due to the reduced thickness of the center cap substrate, and the production of a low cost manner of providing trim or decoration to the wheel cover. Complex graphic designs may be obtained easily by the subject invention.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
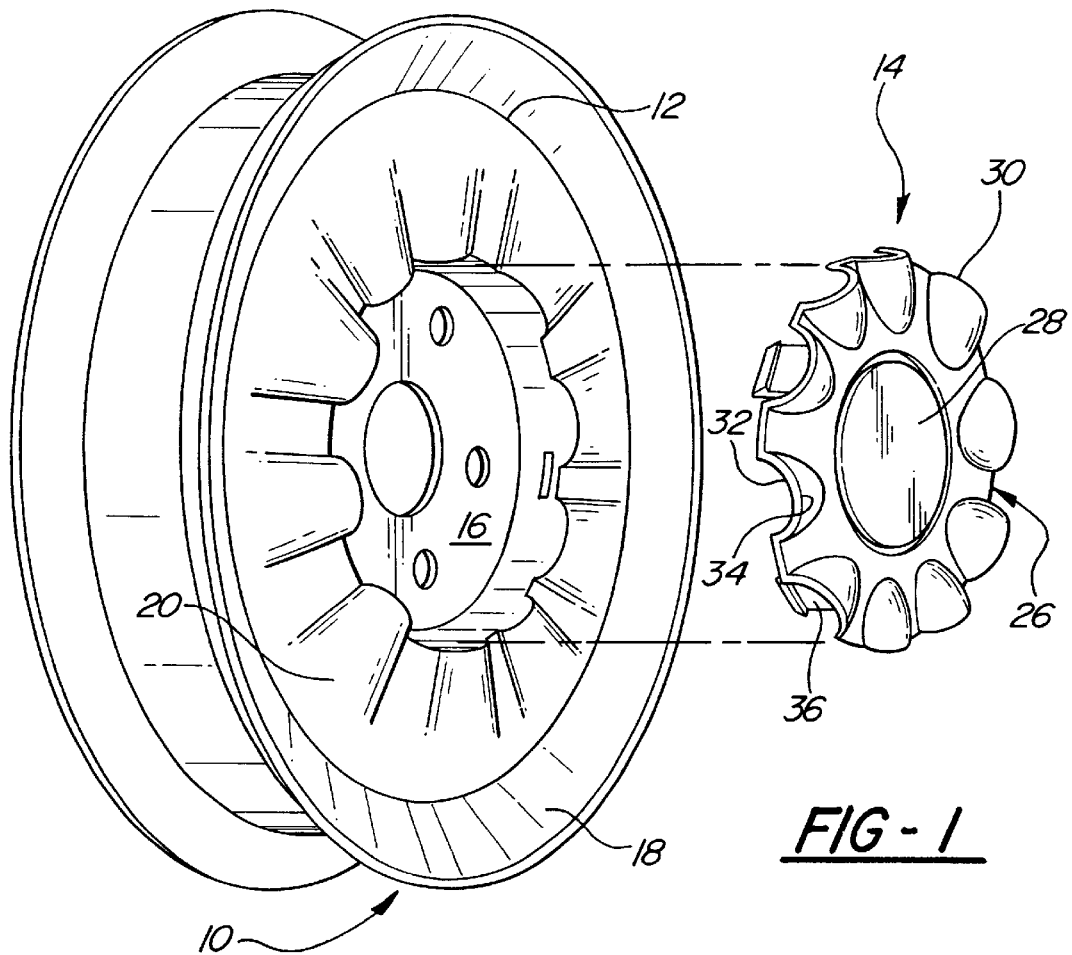
FIG. 1 is an exploded view of a wheel and wheel cover.
Figure 2:
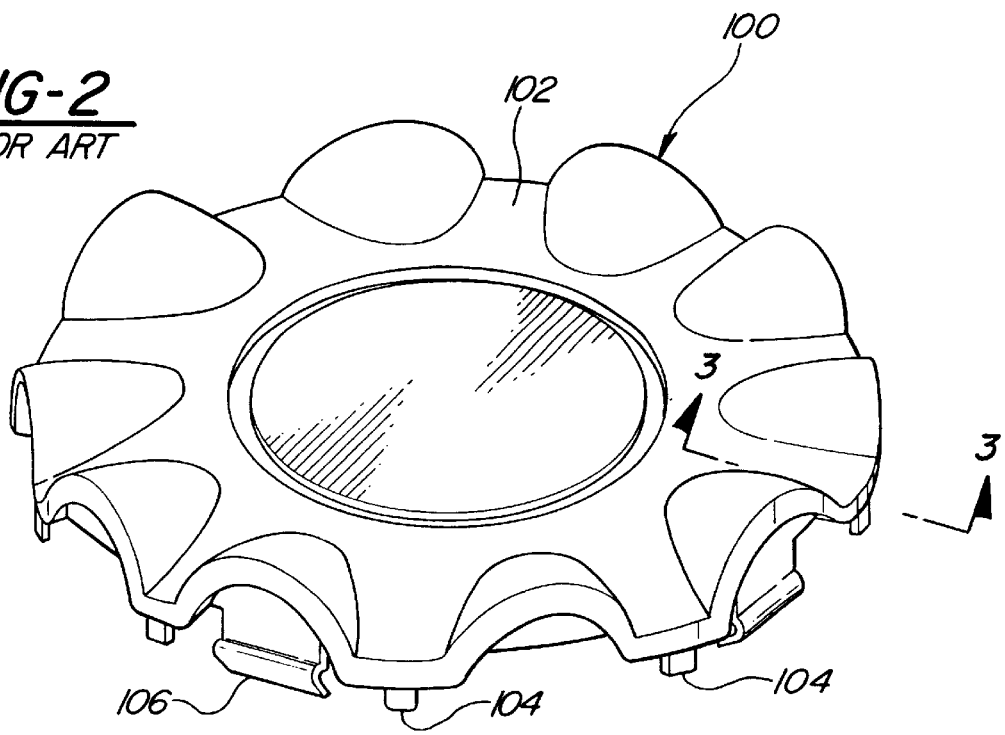
FIG. 2 is a perspective view of the center cap of the prior art.

FIG. 1 illustrates a composite wheel generally indicated at 10. The composite wheel 10 includes a vehicular wheel 12 and a wheel cover 14. The wheel 12 may be made of an alloy or steel, or any other suitable material. A tire (not shown) is seated within the vehicular wheel 12. The vehicular wheel 12 includes a hub receiving end 16 and an outer rim 18. The hub receiving end 16 receives a wheel hub (not shown) of a motor vehicle. A spider 20 extends between the outer rim 18 and the hub receiving end 16. The spider 20 may be of any shape or contour as is desired.

Referring to FIG. 1, the wheel cover 14 is illustrated as being a center cap assembly. The center cap assembly 14 is used to provide wheel ornamentation to decorate the wheel 12, and more particularly the hub receiving end 16. The wheel 12 is secured to a wheel hub using a plurality of lug nuts which are threadingly engaged with a stud, as commonly known in the art. Although the subject invention is illustrated by use of the center cap assembly 14, it is to be understood that the teachings of the invention may also be applied to a wheel cover extending over any portion of the wheel, such as the spider 20 of the vehicle wheel 12.

Figure 4:
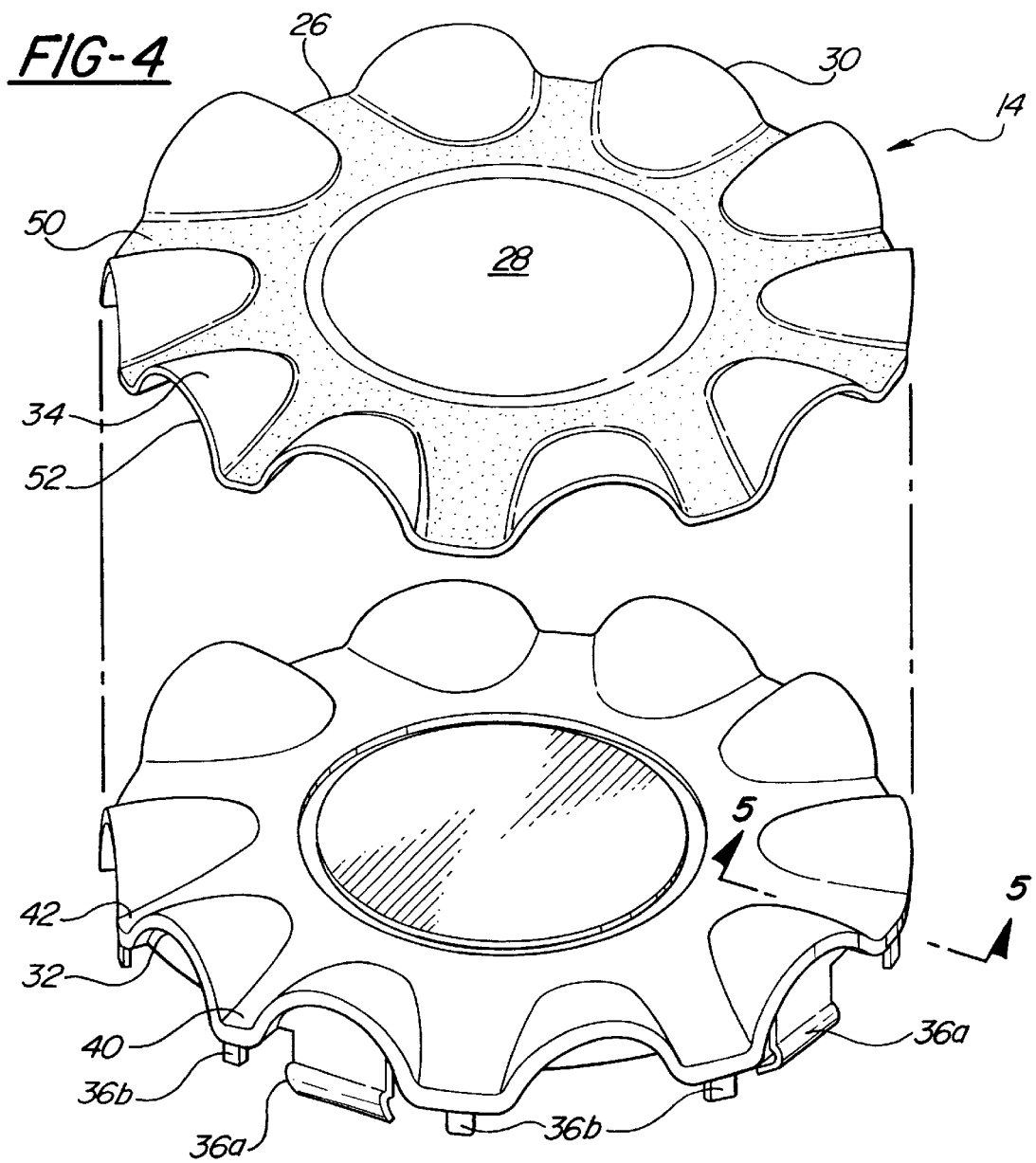
FIG. 4 is an exploded view of the center cap of the subject invention.
Figure 3:
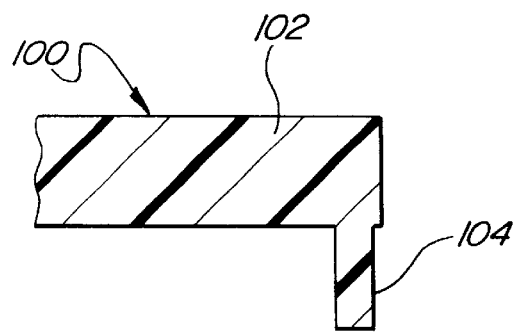
FIG. 3 is a cross-sectional view taken along lines 3—3 of FIG. 2 of the prior art.
Figure 5:
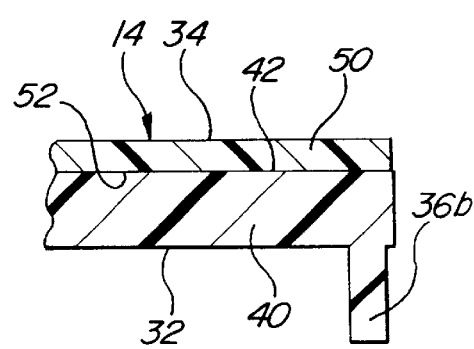
FIG. 5 is a cross-sectional view taken along lines 5—5 of FIG. 4.

The center cap assembly 14 can be shaped as a disk 26 as illustrated in FIGS. 4 and 5. The disk 26 defines a center 28, a periphery 30, an inboard surface 32 and an outboard surface 34. The inboard surface 32 includes a plurality of protrusions 36 extending outwardly therefrom. When the center cap assembly 14 is being secured to the wheel 12, the plurality of protrusions 36 extend toward the wheel 12 to be secured therewith. The shape or configuration of the protrusions 36 may be cylindrical such that the interiors of the protrusions 36 are hollow or solid, or may be of any various shape such as cube, box, frustum, etc., which allows location and locking. The hollowness of the protrusions 36 allow for an enlarged diameter without the protrusions 36 affecting the surface design of the outboard surface 34. However, depending on the material of the disk 26, the thickness of the wall creating the protrusions 36 in the prior art could only be ⅖ to ½ the thickness of the disk 26, i.e., the distance between the inboard 32 and outboard 34 surfaces.

The protrusions 36 may be used for locking the center cap assembly 14 onto the wheel 12 or for locating or positioning purposes. As illustrated in FIG. 4, the protrusions 36 are illustrated as locking arms 36a and guide or location nubs 36b. Both types of protrusions 36 may create the undesired depression effect on the outer surface during molding thereof when the thickness of the disk 26 is less than two times the width of the protrusions 36 (or wall of the protrusions 36 if hollow). The protrusions 36 are generally spaced along the periphery 30 of the disk 26 to properly align the disk 26 with respect to the lug nuts. The locating nubs 36b also ensure the proper alignment with any other type of wheel nut engaging retainers. The various methods of attaching the center cap assembly 14 to the wheel 12 are known in the prior art.

The center cap assembly 14 is more specifically illustrated in FIGS. 4–5 and includes a wheel cover substrate 40 having a predetermined substrate contour and including an outer substrate surface 42 and providing the inboard surface 32 which is placed adjacent the vehicle wheel 12. The protrusions 36 extend outwardly from the inboard surface 32 and have a protrusion thickness. The substrate 40 is formed of a decreased substrate thickness less than two times the protrusion thickness. This may cause depressions 46 to occur in the outer substrate surface 42 opposing the protrusions 36 due to the decreased thickness. The substrate 40 may be formed of a polymeric material, metal or any other composite.

Figure 6:
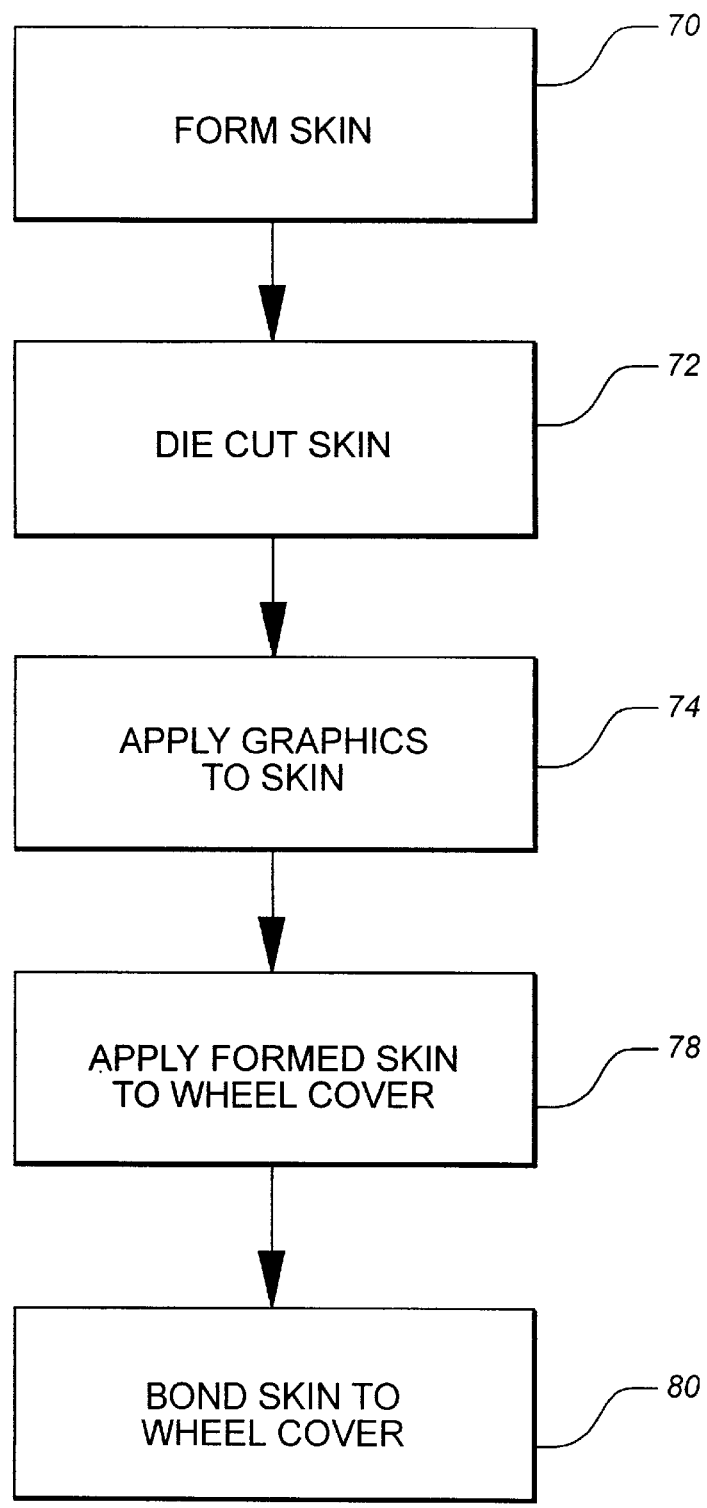
FIG. 6 is a flow chart illustrating the method of making the wheel cover.

The method of forming the wheel cover assembly or center cap assembly 14 which allows a decoration to be placed thereon and which prevents any depressions 46 due to the protrusions 36 from being visible at the outboard surface 34 is illustrated in FIG. 6. The substrate 40 is formed at step 70.

The center cap assembly 14 also includes a thin skin or film 50 having an inner skin surface 52 and providing the outboard surface 34. The skin 50 is generally flexible. The skin 50 is applied and bonded to the substrate 40 to hide or smooth over the outer substrate surface 42 to substantially eliminate the appearance of the depressions 46 at the outboard surface 34. In order to prepare the skin 50 for bonding to the substrate 40, the skin 50 is cut to a predetermined shape and size for placement on the center cap substrate 40 at step 72 in FIG. 6, i.e., the skin 50 may be cut to the same perimeter dimension as the center cap substrate 40 or as desired for decorative purposes. The skin 50 may be cut to the desired shape by any suitable cutting method including: die cutting, laser cutting and hard tooling.

Thereafter, the skin 50 is decorated with a decoration or graphic design at step 74. The decoration is applied to the inner skin surface 52 which may include any desired trim including a solid color or complex, multi-color designs. The skin 50 may be decorated or printed with any type of suitable ink or material, such as water based ink, high-heat polycarbonate printing ink, foils, etc. Furthermore, the inner skin surface 52 may be decorated or printed through a variety of commonly known decoration methods including screen printing, flexo-graphic and offset printing. The printing material or type utilized would depend largely on the type of materials used for the substrate 40 and skin 50, the bonding process and the desired decorative effect. The skin 50 may be cut before or after the decorating step.

An adhesive layer may then be applied to the inner skin surface 52 over the decoration for protecting the decorations that may be applied to the inner skin surface 52 during subsequent manufacturing processes. An adhesive is particularly useful when foils are used as the decoration. In this case, a back film adhesion promoter can be utilized, such as a urethane type product. Alternatively, the materials for the skin 50 and substrate 40 may be selected such that welding or adhering occurs therebetween upon heat setting same so that a separate adhesive is not required. When the materials of the skin 50 and substrate 40 are closely matched, the two may be compressed together and then heated causing welding between the materials.

The skin 50 is deformed and shaped to complement the substrate contour in step 76. By deforming the skin 50, undesired wrinkles will be prevented when the skin 50 is bonded or adhered to the contoured substrate 40. It is preferred that the skin 50 be deformed after printing and application of any adhesive. However, in some circumstances the deforming may occur prior thereto. The skin 50 may be formed by a variety of techniques commonly known in the art. The forming techniques may include: thermoforming, high-pressure forming, hydroforming, and die forming. The forming process in many respects is determined by the complexity of the part to be formed.

Finally, the skin 50 is applied to the substrate 40 at step 78 and welding or bonding to the substrate 40 occurs at step 80 forming the completed center cap assembly 14 ready for installation with the wheel 12.

The skin is typically a polycarbonate-based film, such as a thin polyester film, which may be supplied by Bayer Corporation, Plastics Division, Pittsburgh, Pa. An example of a wheel cover or center cap assembly 14 according to the teachings herein and which has been useful includes the substrate 40 having a thickness of 2.5 mm±1 mm, protrusions 36 with a width of 40% of wall thickness, and a skin 50 with a thickness of twenty thousandths.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A method of making a wheel cover for placement on a vehicle wheel, said method comprising the steps of:

forming a wheel cover substrate having a substrate contour with an outer substrate surface and an inboard surface to be placed adjacent the vehicle wheel and protrusions extending from the inboard surface for engaging the vehicle wheel and having a protrusion thickness at least two times the substrate thickness wherein depressions occur in the outer substrate surface;

forming a thin skin having an inner skin surface and an outboard surface;

cutting the skin to a predetermined shape;

applying a decoration to the skin;

deforming and shaping the skin to complement the substrate contour; and securing the skin to the substrate with the inner skin surface adjacent the outer substrate surface so that no contour changes occur on the outboard surface due to the depressions.

2. A method as set forth in claim 1 further including applying the decoration to the inner skin surface.

3. A method of making a wheel cover for placement on a vehicle wheel, said method comprising the steps of:

forming a wheel cover substrate having a substrate contour with an outer substrate surface and an inboard surface to be placed adjacent the vehicle wheel;

forming a thin skin having an inner skin surface and an outboard surface;

cutting the skin to a predetermined shape;

applying a decoration to the inner skin surface;

applying an adhesive to the inner skin surface of the skin after the application of the decoration;

deforming and shaping the skin to complement the substrate contour; and securing the skin to the substrate with the inner skin surface adjacent the outer substrate surface.

4. A method as set forth in claim 1 further including forming a center cap of the wheel cover having a center cap contour and deforming the skin to complement the contour of the center cap contour.

5. A method as set forth in claim 4 further including bonding the deformed skin to the center cap.

6. A method of making a center cap of a wheel cover for placement on a vehicle wheel, said method comprising the steps of:

forming a center cap of the wheel cover having a center cap contour with an outer surface and an inner surface;

forming a thin skin having an inner skin surface and an outboard surface;

cutting the skin to a predetermined shape;

applying a decoration to the inner skin surface;

deforming the skin to complement the contour of the center cap contour;

bonding the deformed skin to the center cap; and forming the center cap with protrusions extending from the inner surface and having a protrusion thickness, and forming the center cap with a decreased thickness less than two times the protrusion thickness wherein depressions occur in the outer surface opposing the protrusions due to the decreased thickness so that the skin applied thereto hides from appearance the depressions at the outboard surface.

7. A multi-layer wheel cover for a vehicle wheel comprising:

a wheel cover substrate having a substrate contour and thickness with an outer substrate surface and an inboard surface to be placed adjacent a vehicle wheel;

said wheel cover substrate including protrusions extending from said inboard surface for engaging the vehicle wheel and having a protrusion thickness at least two times said substrate thickness wherein depressions occur in the outer substrate surface due to the thickness proportions; and a skin formed of complementing contour and secured to said outer substrate surface, said skin smoothing over the depressions so that no contour changes occur on said outboard surface due to the depressions.

8. A wheel cover as set forth in claim 7 further including a decoration applied between said substrate and said skin.

* * * * *